(12) United States Patent
Wang et al.

(10) Patent No.: US 12,421,149 B2
(45) Date of Patent: Sep. 23, 2025

(54) METHOD FOR PROMOTING METHANE PRODUCTION FROM SLUDGE BY ANAEROBIC DIGESTION IN HIGH AMMONIA-NITROGEN HABITAT USING BIOCHAR WITH HIGH C/N RATIO

(71) Applicant: TONGJI UNIVERSITY, Shanghai (CN)

(72) Inventors: Lin Wang, Shanghai (CN); Yunpeng He, Shanghai (CN); Yongmei Li, Shanghai (CN); Qian Ping, Shanghai (CN); Yuqian Lin, Shanghai (CN); Zhicheng Xi, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 431 days.

(21) Appl. No.: 17/981,533

(22) Filed: Nov. 7, 2022

(65) Prior Publication Data

US 2023/0357066 A1    Nov. 9, 2023

(30) Foreign Application Priority Data

May 5, 2022    (CN) .......................... 202210479834.X

(51) Int. Cl.
  *C02F 11/04*    (2006.01)
  *C02F 1/28*    (2023.01)
  (Continued)

(52) U.S. Cl.
  CPC .............. *C02F 11/04* (2013.01); *C02F 1/283* (2013.01); *C02F 11/004* (2013.01);
  (Continued)

(58) Field of Classification Search
  CPC ........ C02F 11/04; C02F 1/283; C02F 11/004; C02F 2101/16; C02F 2303/06; Y02E 50/30; Y02W 30/04
  (Continued)

(56) References Cited

U.S. PATENT DOCUMENTS

2016/0376205 A1 * 12/2016 Lyu .......................... C10G 1/00
                                                                            71/10
2020/0071218 A1 *  3/2020 Mumme ................ C12M 45/02
(Continued)

FOREIGN PATENT DOCUMENTS

CN    106010601 B  *  8/2019
CN    110127972 A  *  8/2019 .............. C02F 11/04
(Continued)

OTHER PUBLICATIONS

Machine-generated English translation of CN 114525146, generated on Mar. 8, 2025.*

(Continued)

*Primary Examiner* — Fred Prince
(74) *Attorney, Agent, or Firm* — Troutman Pepper Locke LLP; Tim Tingkang Xia, Esq.

(57) ABSTRACT

The present invention discloses a method for promoting methane production by anaerobic digestion in a high ammonia-nitrogen habitat using a biochar with a high carbon-to-nitrogen (C/N) ratio. In this method, a biochar material prepared by dry distillation and carbonization is added to municipal sludge for medium-temperature anaerobic digestion treatment, which increases the efficiency of methane production from sludge by anaerobic digestion in different ammonia-nitrogen stress habitats, thereby realizing the utilization of sludge as resources.

4 Claims, 6 Drawing Sheets

(51) Int. Cl.
     *C02F 11/00*     (2006.01)
     *C02F 101/16*   (2006.01)

(52) U.S. Cl.
     CPC ...... *C02F 2101/16* (2013.01); *C02F 2303/06* (2013.01); *Y02E 50/30* (2013.01); *Y02W 30/40* (2015.05)

(58) Field of Classification Search
     USPC ........................................ 210/603, 612, 613
     See application file for complete search history.

(56) References Cited

U.S. PATENT DOCUMENTS

| | | | | |
|---|---|---|---|---|
| 2022/0064043 A1* | 3/2022 | Dai | .......................... | C02F 11/04 |
| 2022/0073391 A1* | 3/2022 | Pressley | .................. | C02F 3/343 |

FOREIGN PATENT DOCUMENTS

| | | | | | |
|---|---|---|---|---|---|
| CN | 111690692 A | * | 9/2020 | .............. | C02F 11/04 |
| CN | 113880384 A | | 1/2022 | | |
| CN | 114525146 A | * | 5/2022 | | |
| WO | WO-2011097183 A2 | * | 8/2011 | .............. | B01J 20/20 |

OTHER PUBLICATIONS

Machine-generated English translation of CN 111690692, generated on Mar. 8, 2025.*
Machine-generated English translation of CN 106010601, generated on Mar. 8, 2025.*
Machine-generated English translation of CN 110127972, generated on Jul. 1, 2025.*

* cited by examiner

METHOD FOR PROMOTING METHANE PRODUCTION FROM SLUDGE BY ANAEROBIC DIGESTION IN HIGH AMMONIA-NITROGEN HABITAT USING BIOCHAR WITH HIGH C/N RATIO

CROSS-REFERENCE TO RELATED PATENT APPLICATION

This non-provisional application claims priority to and the benefit of, pursuant to 35 U.S.C. § 119(a), patent application Serial No. CN 202210479834.X filed in China on May 5, 2022. The disclosure of the above application is incorporated herein in its entirety by reference.

TECHNICAL FIELD

The present invention relates to the technical field of sludge treatment and application, and specifically, to a method for promoting methane production from sludge by anaerobic digestion in a high ammonia-nitrogen habitat using a biochar with a high carbon-to-nitrogen (C/N) ratio.

BACKGROUND

Sludge treatment has become a big challenge for China. Excess sludge is a product of contaminant transfer and transformation during urban sewage treatment, and is an inevitable "by-product" at this stage. In recent years, with the increase in the amount of sewage treated, the amount of excess sludge has also increased significantly. At present, the annual output of municipal sludge from sewage treatment plants in China has already exceeded 30 million tons (with a moisture content of about 80%), imposing a heavy burden for sludge treatment. In addition, the sludge from sewage treatment plants in China has the characteristics of high organic matter content, high moisture content, low calorific value, and containing hazardous substances, and no desirable treatment method has been developed yet.

Anaerobic digestion, also known as methane fermentation, is currently the most widely used method for sludge stabilization and utilization as resources in the world. The anaerobic digestion technology makes use of metabolism of microorganisms under anaerobic conditions to transform organic matters in garbage or sludge into products such as methane with a high calorific value, and the digested sludge can be used as an organic fertilizer on farmland, thereby reducing the amount of sludge to be disposed of, making the sludge harmless, and utilizing the sludge as resources. The application of the anaerobic digestion technology is mature, with significant environmental and economic benefits. Studies have shown that after anaerobic digestion, the organic matter contained in sludge from sewage treatment plants is reduced by 40%-55%.

The pervasive instability of the anaerobic digestion process limits the promotion of this technology and is an urgent problem to be resolved. In the case of high substrate load, high food-to-microorganism ratio (F/M, which is the ratio of substrate COD to inoculum volatile solids (VS) added into the anaerobic digestion system), insufficient activity of anaerobic sludge, unsmooth discharge of the digested sludge, and the like, the anaerobic digestion process is unstable and is prone to high ammonia-nitrogen stress, accumulation of volatile fatty acids (VFAs), low COD degradation rate, and low methane yield, leading to inefficient running or even failure of the reaction system. Studies have shown that in practice, most of anaerobic digestion projects are in poor operating conditions.

Existing studies have shown that adding biochar as an additive to sludge during anaerobic digestion can ensure gas production efficiency and stability of the anaerobic digestion process to a certain extent. However, in actual application scenarios, there will be various different high ammonia-nitrogen stress habitats, which require different biochar materials. In addition, existing biochar materials can promote gas production only in moderately high ammonia-nitrogen stress habitats, but are not applicable under higher ammonia nitrogen stress. For example, ammonia nitrogen concentration in the environmental to which the literature CN113880384A can be applied is still less than 2000 mg/L. Therefore, the narrow application range and the inability to adapt to environments with higher ammonia nitrogen concentration seriously restrict the practical application and development of sludge anaerobic digestion technologies.

SUMMARY OF INVENTION

To overcome the deficiencies in the related art, an objective of the present invention is to provide a method for promoting methane production from sludge by anaerobic digestion in a high ammonia-nitrogen habitat using a biochar with a high C/N ratio. Compared with the related art, the technical application of the present invention is applicable to a wider range of ammonia nitrogen concentrations and can be applied in a higher ammonia-nitrogen stress habitat, is simple to operate, has a wide source of raw materials, low costs, and little secondary pollution, and meets the actual production needs, and therefore has great industrial application potential in sludge treatment.

In order to achieve the above objective, the present invention adopts the following technical solutions:

Provided is a method for promoting methane production from sludge by anaerobic digestion in a high ammonia-nitrogen habitat using a biochar with a high C/N ratio, including: adding a high C/N biochar material to an amount of sludge; and carrying out medium-temperature anaerobic digestion treatment, where the high C/N biochar material is prepared by dry distillation by heating to 360° C.

When the temperature is lower than 360° C., the required degree of carbonization cannot be obtained. When the temperature is higher than 360° C., the material is over-carbonized, which will eventually affect the enrichment of microorganisms.

Further, an ammonia nitrogen concentration in the sludge is 1500-4500 mg/L.

Further, the concentration of the high C/N biochar material added is 12 g/L.

Under the above high ammonia-nitrogen stress conditions, the addition of high C/N biochar material with a concentration of 12 g/L basically does not affect the release of ammonia nitrogen from the system. The pH fluctuation in the early stage of the reaction system is reduced, the reaction system is more stable, the production rate and consumption rate of VFAs in each system are increased, the inhibition of acid production and methane production caused by high ammonia-nitrogen stress can be prevented, and the biotransformation process can be accelerated.

Further, a reaction time of the medium-temperature anaerobic digestion treatment is 20-80 d.

Further, a reaction time of the medium-temperature anaerobic digestion treatment is preferably 52 d.

If the reaction time is less than 20 days, due to the hysteresis effect of high ammonia nitrogen on methane production, the system is still in the stage of producing VFAs, and the methane yield has not reached the peak. If the reaction time is more than 80 days, the biochar and functional microorganisms for methane production are no longer dominant, and there is no longer methane production. Preferably, a reaction time is 52 d.

Further, the temperature of the medium-temperature anaerobic digestion treatment is 35±1° C.

Further, a raw material of the high C/N biochar material is banana peels.

Further, a specific method for preparing the high C/N biochar material includes drying a biomass raw material in an oven, placing the dried biomass raw material in a high-temperature furnace for dry distillation from room temperature to 360° C. at a ramping rate of 20° C. and then carbonization at 360° C. for 2 h, cooling down to room temperature after the dry distillation and carbonization, taking out and crushing the resultant material, and drying the crushed material at 105° C. for 24 h.

Further, the sludge is municipal sludge with a total solids concertation (TS) of 127.9 g/L.

Further, the high C/N biochar material has following composition: 85.5% of C, 2.8% of N, 10.53% of O, 0.93% of P, and 0.39% of S; and the high C/N biochar material has a specific surface area of 15.6736 $m^2/g$ and a pore volume of 0.118444 $cm^3/g$.

Compared with the related art, the present invention has the following advantages.

1. In the present invention, based on sludge anaerobic digestion technology, fruit and vegetable waste such as banana peels is used to prepare a biochar material by dry distillation at 360° C., and the biochar material is added to urban dewatered sludge for medium-temperature anaerobic digestion treatment. In different high ammonia-nitrogen stress habitats, the efficiency of methane production from sludge can be increased, the inhibitory effect of high ammonia nitrogen can be reduced, and in a higher ammonia-nitrogen stress habitat, the present invention shows better promotion effect.

2. The method provided by the present invention is environmentally friendly, does not cause secondary pollution, and is simple to operate. The material is available from a wide range of resources and can be prepared at low costs. The technology has a wide application range, is applicable to different ammonia-nitrogen stress conditions, and requires lower modification costs when applied to the existing equipment.

BRIEF DESCRIPTION OF THE DRAWINGS

To make the objectives, technical solutions, and advantages of the embodiments of the present invention more comprehensible, the following clearly and completely describes the technical solutions in the embodiments of the present invention with reference to the accompanying drawings in the embodiments of the present invention.

DETAILED DESCRIPTION

The present invention is further described below in conjunction with the accompanying drawings and specific examples in this specification, but the protection scope of the present invention is not limited thereto.

Example 1

The present invention provides a method for promoting methane production from sludge by anaerobic digestion in a high ammonia-nitrogen habitat using a biochar with a high C/N ratio, including the following steps.

(1) Preparation of high C/N biochar material. Banana peels, as a raw material for preparation, were weighed and placed on a tray evenly, and the tray was put in an oven to dry. The dried banana peels were weighed and placed in a high-temperature furnace with the door well-closed for dry distillation, from 20° C. to 360° C. at a ramping rate of 20° C. and then carbonization at 360° C. for 2 h. After dry distillation and carbonization, the banana peels were cooled down to 20° C. After dry distillation and carbonization, the banana peels were cooled down and taken out, and put in a crusher for crushing, dried at 105° C. for 24 h, and then preserved in a sealed bag for further utilization.

Figure 1:
FIG. 1 shows the appearance characteristics of the high C/N biochar material in Example 1 of the present invention.
Figure 2:
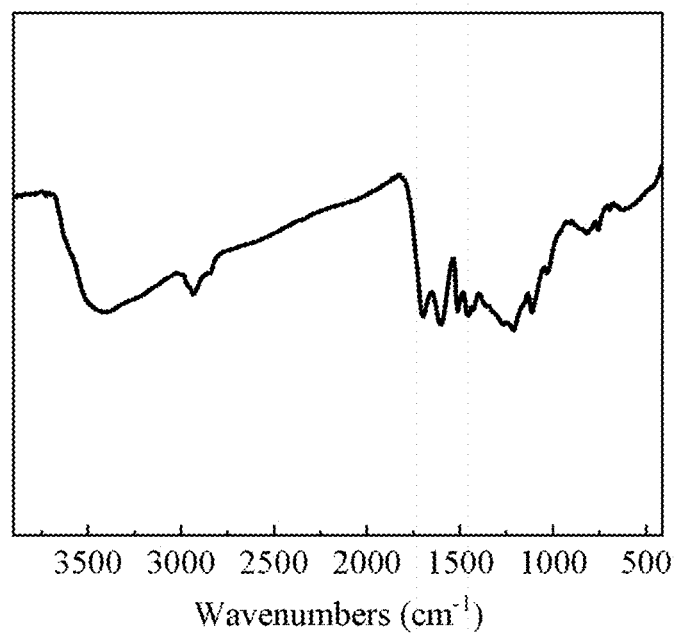
FIG. 2 shows the analysis of characteristic functional groups of the high C/N biochar material in Example 1 of the present invention.
Figure 3:
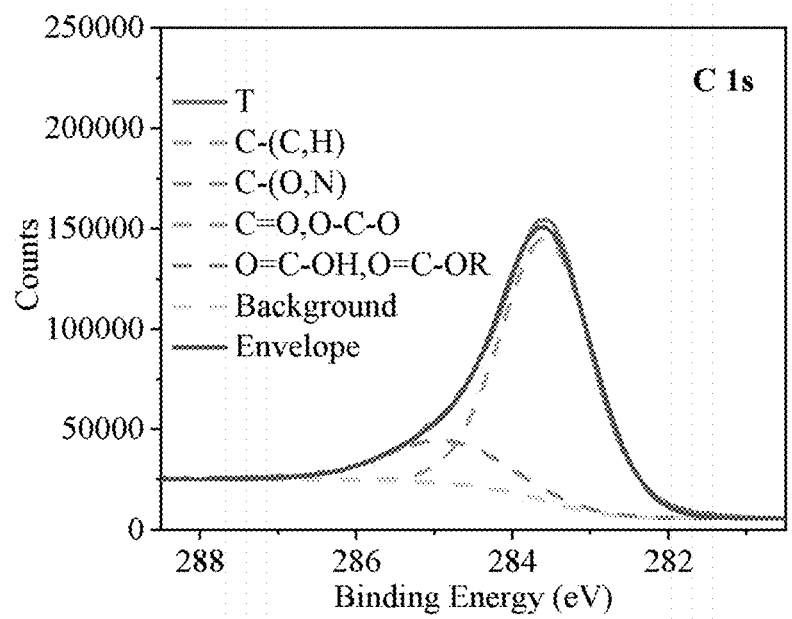
FIG. 3 shows the analysis of chemical functional groups related to C, O, N of the high C/N biochar material in Example 1 of the present invention.

The appearance characteristics of the banana peel biochar material are shown in FIG. 1. The proportions of elements of the banana peel biochar material were measured by an elemental analyzer, and the results were as follows: C (85.35%), N (2.80%), O (10.53%), P (0.93%), and S (0.39%). The characteristic functional groups of the high C/N biochar material were determined by a Fourier-transform infrared spectrometer (FTIR), and the results were shown in FIG. 2. The FTIR analysis results show that the main functional groups are: $CH_2$ asymmetric stretching vibration (wavelength of $2930\pm10$ $cm^{-1}$), amide II (wavelength of $1550\pm20$ $cm^{-1}$), and aromatic amino acids and nucleotides (wavelength of 900-600 $cm^{-1}$). The results of further analysis by XPS show that: the functional groups related to C and N of the biochar material are C—(C,H) (283.8 eV) and C—(C,N)(285.2 eV) respectively, and the results were shown in FIG. 3.

The BET results show that: the high C/N biochar prepared from banana peels has a moderate specific surface area of 15.6736 $m^2/g$ but a large pore volume of 0.118444 $cm^3/g$, facilitating the enrichment of anaerobic microorganisms.

(2) 212 mL of municipal sludge with 87.2% moisture content was measured into a 250 mL jar. Group A is a control group without additional substances. In group B, a certain amount of ammonium bicarbonate was added to reach an additional ammonia nitrogen concentration of 3000 mg $NH_4^+$—N/L. In group C, a certain amount of biochar material was added to make its concentration 12 g/L. In group D, biochar material and ammonium bicarbonate were added in equal amounts to group C and group B respectively. For each group, 3 groups were provided in triplicate.

(3) The jar was sealed with a rubber plug and placed in a thermostatic shaking incubator with a shaking frequency of 200 rpm and a temperature of $35\pm1°$ C., for a reaction time of 52 d.

(4) According to the reaction condition, each group was sampled to analyze pH, ammonia nitrogen concentration, VFAs concentration, and cumulative methane production yield. The pH was measured by a pH meter. The ammonia nitrogen concentration was determined by Nessler's reagent spectrophotometry. The VFAs concentration was determined by gas chromatography with flame ionization detection (GC-FID). The cumulative methane production yield was obtained through calculation based on the periodically measured gas production yield and the proportion of methane in gas as determined by GC-FID.

(5) Taking time t as the abscissa, and taking pH, ammonia nitrogen concentration, VFAs concentration, and cumulative methane production yield as ordinates respectively, the results obtained are shown in FIG. 4 to FIG. 7.

Figure 4:
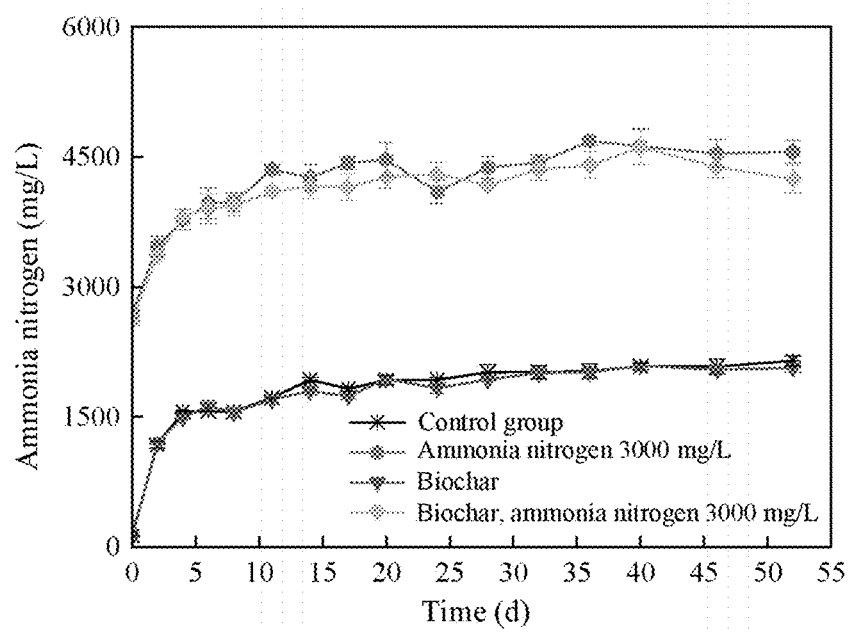
FIG. 4 shows an effect of the high C/N biochar material in Example 1 of the present invention on an ammonia nitrogen concentration in a reaction system in a high ammonia-nitrogen stress habitat.

(6) It can be learned from FIG. 4 that in this example, under the high ammonia-nitrogen stress conditions, the addition of high C/N biochar material with a concentration of 12 g/L does not substantially affect the release of ammonia nitrogen from the system.

Figure 5:
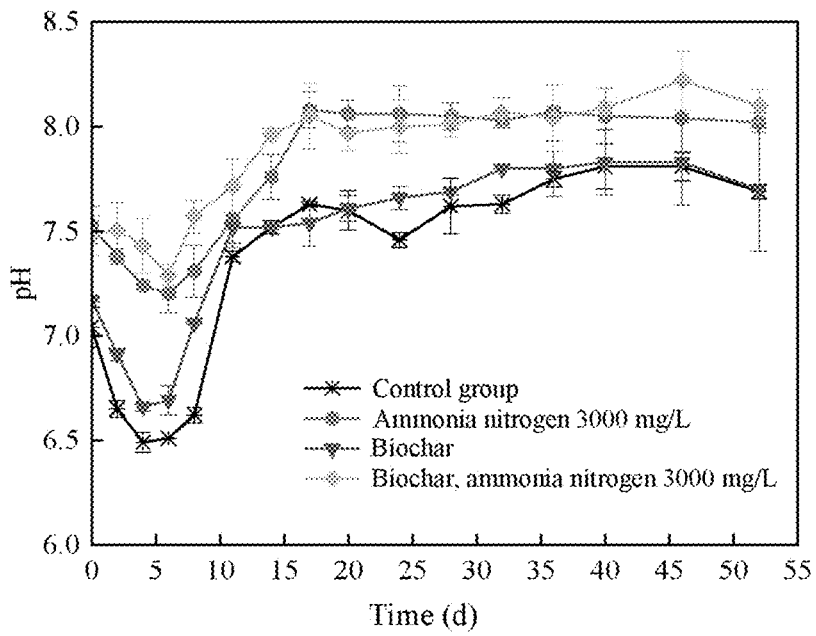
FIG. 5 shows an effect of the high C/N biochar material in Example 1 of the present invention on pH of a reaction system in a high ammonia-nitrogen stress habitat.

(7) It can be learned from FIG. 5 that in this example, under the high ammonia-nitrogen stress conditions, the addition of high C/N biochar material with a concentration of 12 g/L reduces the pH fluctuation in the early stage of the reaction system and makes the reaction system more stable.

Figure 6:
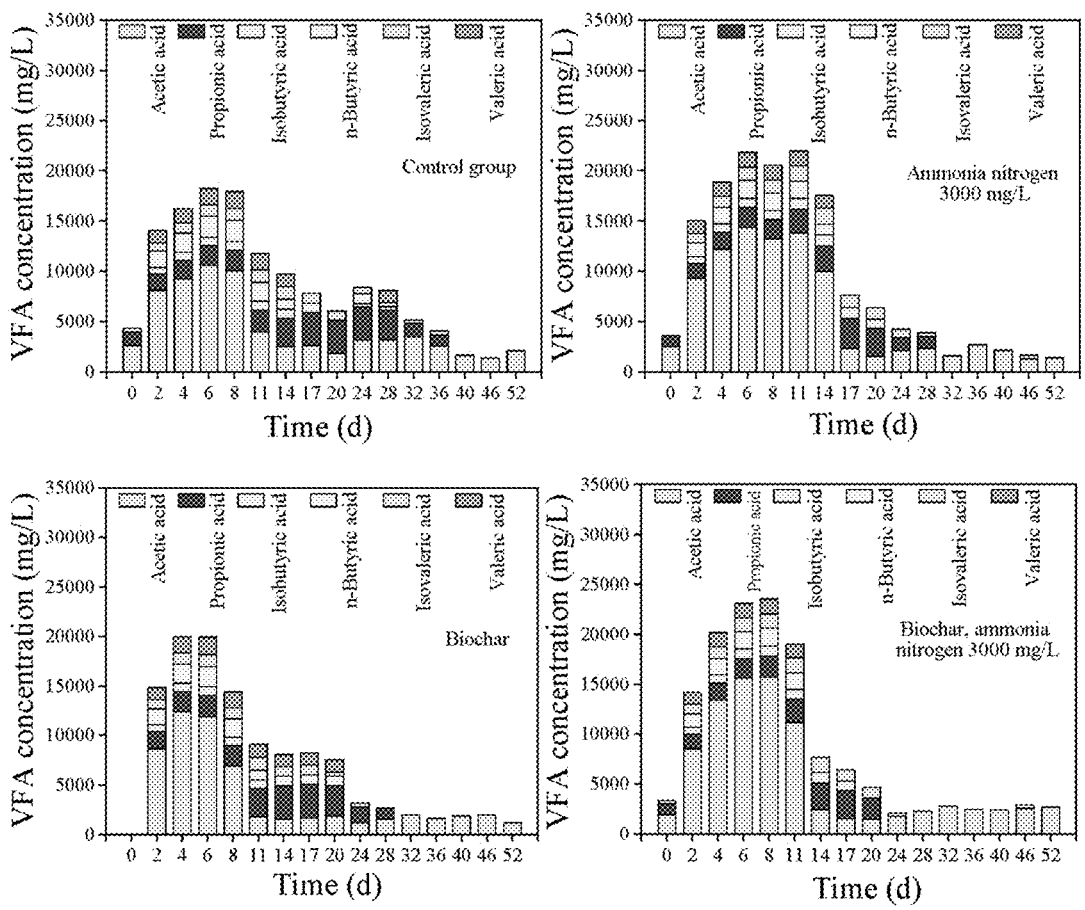
FIG. 6 shows an effect of the high C/N biochar material in Example 1 of the present invention on a VFAs concentration in a reaction system in a high ammonia-nitrogen stress habitat.

(8) It can be learned from FIG. 6 that in this example, the additional ammonia-nitrogen stress condition causes significant VFAs accumulation in the early stage of the system, delay of the turning point of VFAs consumption, and significant inhibition of methane production for acetic acid. Under the high ammonia-nitrogen stress conditions, the addition of high C/N biochar material with a concentration of 12 g/L can increase the production rate and consumption rate of VFAs in each system, prevent the inhibition of acid production and methane production caused by high ammonia-nitrogen stress, and accelerate the biotransformation process.

Figure 7:
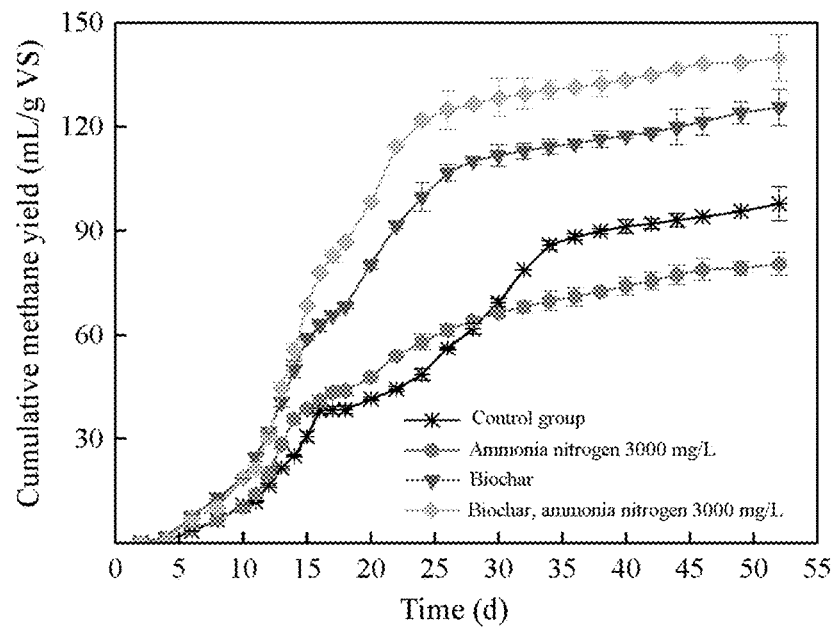
FIG. 7 shows an effect of the high C/N biochar material in Example 1 of the present invention on a cumulative methane production yield of a reaction system in a high ammonia-nitrogen stress habitat.

(9) It can be learned from FIG. 7 that in this example, the additional ammonia-nitrogen stress condition significantly reduces the maximum methanogenic potential in the later stage of the directed biotransformation system, and significantly inhibits methane production. Under different ammonia-nitrogen stress conditions, the addition of biochar material with a concentration of 12 g/L can increase the cumulative methane production yield in all the directed biotransformation system, and prevent the inhibition of methane production caused by high ammonia-nitrogen stress, so that under high ammonia-nitrogen stress compared with the control group, the cumulative methane production yield is increased from −17.69% to 42.87%, greatly increasing the methane production.

Through the characterization analysis of the high C/N biochar material and the performance analysis of the effect of anaerobic biotransformation under different ammonia-nitrogen stress conditions, the 12 g/L banana peel biochar material helps reduce the ammonia inhibition of the anaerobic digestion system of highly solid-containing sludge in a high ammonia-nitrogen stress habitat.

Figure 8:
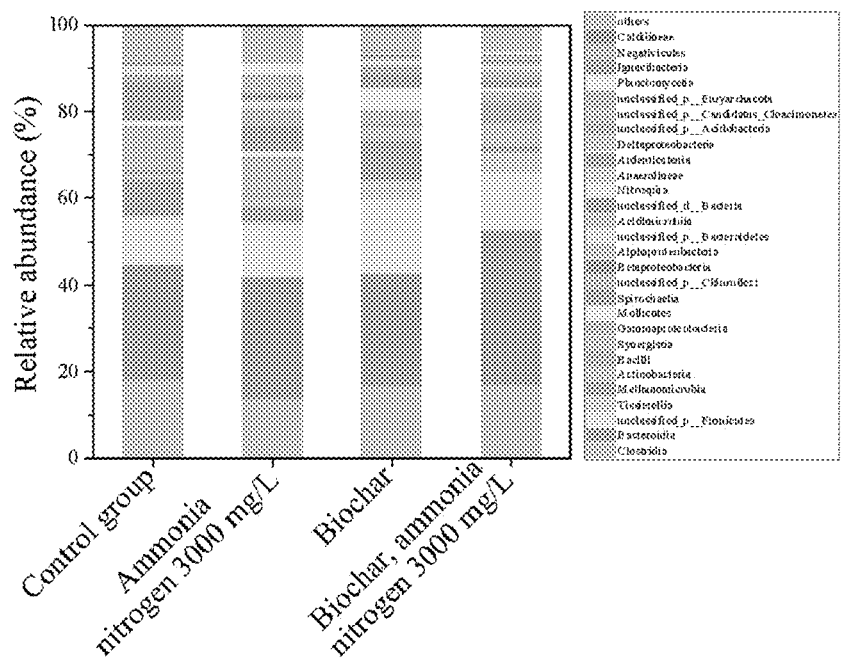
FIG. 8 shows the change of functional microorganisms in a system with the high C/N biochar material in Example 1 of the present invention added.

It can be learned from FIG. 8 that the microbial communities of the control group and the ammonia nitrogen group are similar, and the microbial community structure changes significantly after adding the high C/N biochar material under high ammonia-nitrogen conditions. In the biochar+ammonia nitrogen group, the relative abundance of Bacteroidia increases from 26.4% of the control group to 35.9%, the relative abundance of Tissierellia increases from 0.7% to 4.5%, the relative abundance of Actinobacteria increases from 1.2% to 5.0%, and the relative abundance of Bacilli increases from 0.99% to 5.3%. These are the main functional microorganisms in the anaerobic digestion process. The effective enrichment of these functional microorganisms increases the efficiency of anaerobic methane production from municipal sludge.

It can be learned from FIG. 4 to FIG. 7 that Example 1 can increase the efficiency and accumulation of anaerobic methane production in a wide range of ammonia-nitrogen stress habitats (as shown in FIG. 4, the range of ammonia nitrogen concentration is at least 1500-4500 mg/L), especially in a higher ammonia-nitrogen stress habitat (4500 mg/L of ammonia nitrogen concentration), a better effect is achieved than that in a lower ammonia-nitrogen stress habitat (1500 mg/L of ammonia nitrogen concentration). It is realized that the biochar material promotes the transfer of the ability of methane production from sludge by anaerobic digestion in a high ammonia-nitrogen habitat from narrow range and low concentration to wide range and high concentration, which significantly improves the application prospect of biochar in practical industry, so that the biochar material has higher universality in anaerobic methane production applications.

Figure 9:
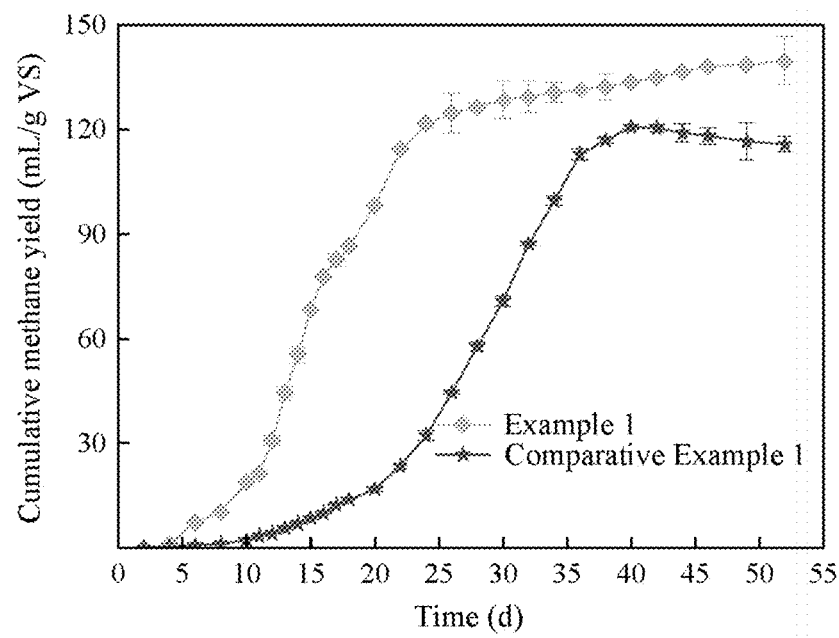
FIG. 9 shows effects of the high C/N biochar material prepared in Example 1 and the biochar material prepared in Comparative Example 1 on a cumulative methane production yield of a reaction system in a high ammonia-nitrogen stress habitat according to the present invention.

Comparative Example 1: The difference from Example 1 lies in that the temperature for preparing the biochar material by dry distillation is 320° C. FIG. 9 shows the effect on the cumulative methane production yield of the reaction system in the high ammonia-nitrogen stress habitat. When the biochar material prepared at 320° C. is added to undergo anaerobic digestion for 52 d, the cumulative methane production yield is significantly lower than that of the biochar material prepared at 360° C.

Figure 10:
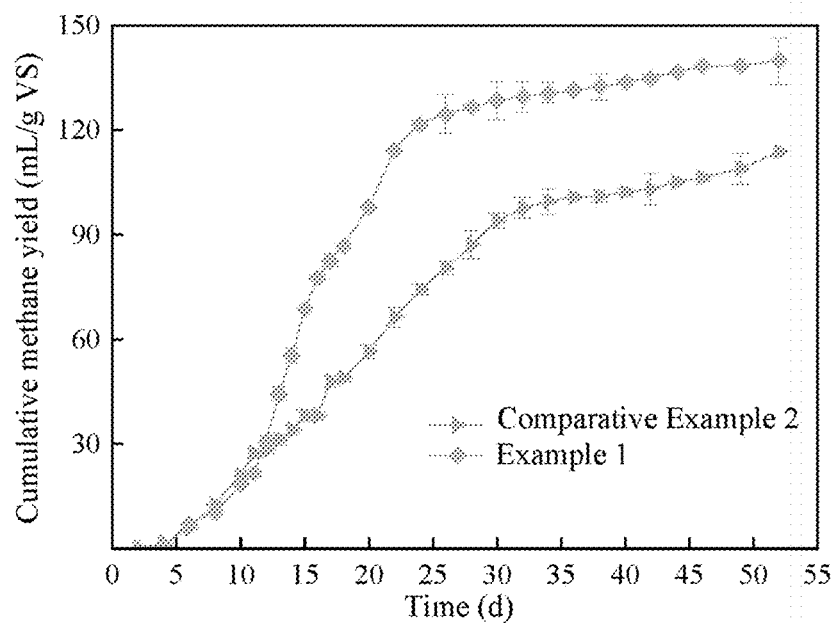
FIG. 10 shows effects of the high C/N biochar material prepared in Example 1 and the biochar material prepared in Comparative Example 2 on a cumulative methane production yield of a reaction system in a high ammonia-nitrogen stress habitat according to the present invention.

Comparative Example 2: The difference from Example 1 lies in that the temperature for preparing the biochar material by dry distillation is 400° C. FIG. 10 shows the effect on the cumulative methane production yield of the reaction system in the high ammonia-nitrogen stress habitat. When the biochar material prepared at 400° C. is added to undergo anaerobic digestion for 52 d, the cumulative methane production yield is significantly lower than that of the biochar material prepared at 360° C.

Figure 11:
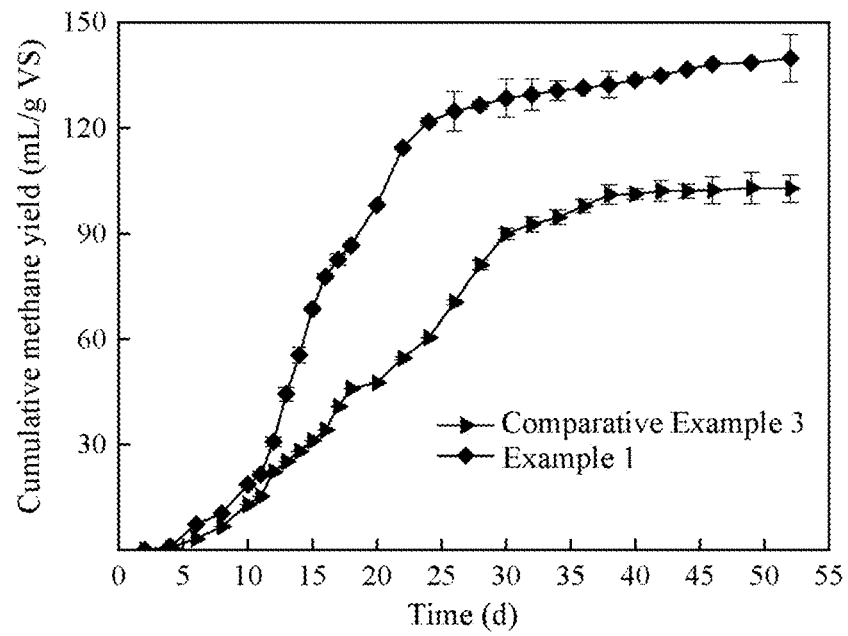
FIG. 11 shows effects of the high C/N biochar material prepared in Example 1 and the biochar material prepared in Comparative Example 3 on a cumulative methane production yield of a reaction system in a high ammonia-nitrogen stress habitat according to the present invention.

Comparative Example 3: The difference from Example 1 lies in that the raw material of the biochar material is a corncob. FIG. 11 shows the effect on the cumulative methane production yield of the reaction system in the high ammonia-nitrogen stress habitat. When the biochar material prepared from the corncob by dry distillation at 360° C. is added to undergo anaerobic digestion for 52 d, the cumulative methane production yield is significantly lower than that of the biochar material prepared from banana peels at 360° C.

Figure 12:
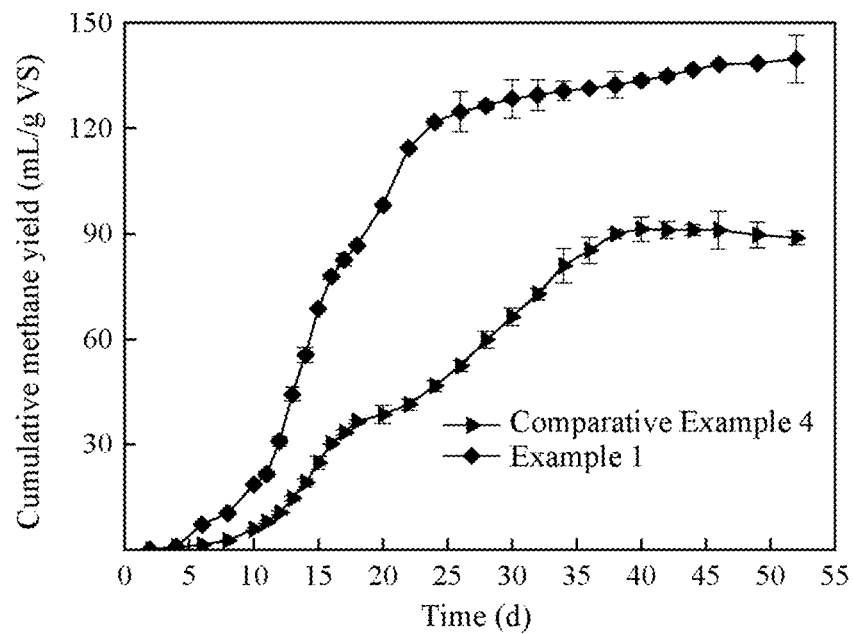
FIG. 12 effects of the high C/N biochar material prepared in Example 1 and the biochar material prepared in Comparative Example 4 on a cumulative methane production yield of a reaction system in a high ammonia-nitrogen stress habitat according to the present invention.

Comparative Example 4: The difference from Example 1 lies in that the raw material of the biochar material is coconut shell. FIG. 12 shows the effect on the cumulative methane production yield of the reaction system in the high ammonia-nitrogen stress habitat. When the biochar material prepared from the coconut shell by dry distillation at 360° C. is added to undergo anaerobic digestion for 52 d, the cumulative methane production yield is significantly lower than that of the biochar material prepared from banana peels at 360° C.

Through Comparative Example 1 and Comparative Example 2, it can be learned that the temperature for dry distillation is an important adjustment parameter. After analysis, the adjustment of this parameter affects the content of C in the biochar material and property parameters such as specific surface area and pore volume, further affects the microbial community structure during the reaction of methane production by anaerobic digestion, and finally affects the cumulative methane production yield of the reaction system in the high ammonia-nitrogen stress habitat as a whole.

The above examples are merely used for describing the technical solutions of the present invention, and are not intended to limit the present invention. Although the present invention is described in detail with reference to the examples, those of ordinary skill in the art should understand that modifications or equivalent replacements may be made to the technical solutions of the present invention without departing from the spirit and scope of the technical solutions of the present invention.

What is claimed is:

1. A method for promoting methane production from sludge by anaerobic digestion in a high ammonia-nitrogen habitat using a biochar material, comprising adding a biochar material to an amount of sludge; and carrying out an anaerobic digestion treatment, wherein the biochar material is prepared by dry distillation by heating to 360° C.;
   wherein the high ammonia-nitrogen habitat has an ammonia nitrogen concentration in the sludge between 2000-4500 mg/L;
   wherein the concentration of the biochar material added to the sludge is 12 g/L;
   wherein a reaction time of the anaerobic digestion treatment is about 52 d;
   wherein the sludge is municipal sludge with a total solids concentration (TS) of 127.9 g/L; and
   wherein the biochar material has following composition: 85.5% of C, 2.8% of N, 10.53% of O, 0.93% of P, and 0.39% of S; and the biochar material has a specific surface area of 15.6736 $m^2/g$ and a pore volume of 0.118444 $cm^3/g$.

2. The method according to claim 1, wherein the temperature of the anaerobic digestion treatment is 35=1° C.

3. The method according to claim 1, wherein a raw material of the biochar material is banana peels.

4. The method according to claim 1, wherein a specific method for preparing the biochar material comprises drying a biomass raw material in an oven, placing the dried biomass raw material in a furnace for dry distillation from room temperature to 360° C. and then carbonization at 360° C. for 2 h, cooling down to room temperature after the dry distillation and carbonization, taking out and crushing a resultant material, and drying the crushed material at 105° C. for 24 h.

* * * * *